United States Patent [19]

Siede

[11] Patent Number: 4,949,818
[45] Date of Patent: Aug. 21, 1990

[54] BRAKE BAND FOR BRINGING THE SAW CHAIN OF A MOTOR-DRIVEN CHAIN SAW TO STANDSTILL

[75] Inventor: Reinhard Siede, Remshalden, Fed. Rep. of Germany

[73] Assignee: Andreas Stihl, Waiblingen, Fed. Rep. of Germany

[21] Appl. No.: 301,602

[22] Filed: Jan. 26, 1989

[30] Foreign Application Priority Data

Jan. 28, 1988 [DE] Fed. Rep. of Germany ....... 3802488

[51] Int. Cl.$^5$ ............................................. F16D 69/02
[52] U.S. Cl. ........................... 188/251 M; 192/107 M; 30/381
[58] Field of Search .......... 188/251 A, 251 M, 251 R; 192/107 M; 30/381

[56] References Cited

U.S. PATENT DOCUMENTS

| 3,848,313 | 11/1974 | Guyonnet | 192/107 M X |
| 4,024,933 | 5/1977 | Hinderks | 188/77 R |
| 4,290,510 | 9/1981 | Warren | 188/107 M X |
| 4,351,885 | 9/1982 | Depoisier et al. | 188/251 M X |
| 4,618,049 | 10/1986 | Pflaum et al. | 192/507 M |
| 4,635,364 | 1/1987 | Noll et al. | 188/251 M X |

FOREIGN PATENT DOCUMENTS

| 62735 | 4/1984 | Japan | 188/251 R |
| 823675 | 11/1959 | United Kingdom | 188/251 R |

Primary Examiner—George E. A. Halvosa
Attorney, Agent, or Firm—Walter Ottesen

[57] ABSTRACT

The invention is directed to a brake band for bringing the saw chain of a chain saw to standstill. Chain saws include safety devices which bring the saw chain to standstill by applying a brake band to a brake drum. These safety devices effect numerous applications of the brake band to the brake drum so that the brake drum wears rapidly and has only a short service life. The brake band of the invention has a friction side which is provided with a layer made of an oxide ceramic which increases the service life for very short braking times even when oil penetrates the region between the brake band and the brake drum.

11 Claims, 1 Drawing Sheet

BRAKE BAND FOR BRINGING THE SAW CHAIN OF A MOTOR-DRIVEN CHAIN SAW TO STANDSTILL

FIELD OF THE INVENTION

The invention relates to a brake band of a motor-driven chain saw which includes a saw chain drive having a rotating component. The rotating component is braked by the brake band is for bringing the saw chain to standstill. The brake band is arranged in the chain saw so as to surround the rotating component within a predetermined enclosure angle and is made of a resilient material which provides the stopping force.

BACKGROUND OF THE INVENTION

Brake bands which surround a brake drum are generally known as braking devices. The brake bands are made of an resilient material such as spring steel or the like whereby a spring return force is available after the brake band has been applied to the brake drum. This return force is utilized for returning the brake band to its initial position. However, consideration should be given to the coefficient of friction when selecting the resilient material since this determines the braking times.

Braking devices comprising brake bands and brake drums are subjected to the highest stress when used in motor-driven chain saws. The braking device operates to immediately bring the saw chain to standstill within the shortest time (a fraction of a second), for example, to prevent a continued running of the saw chain under all circumstances such as when the chain saw is placed down after use so that others are not endangered thereby. For increasing safety, the throttle lever latch is coupled with a braking device acting on the saw chain. By depressing the throttle lever latch, the braking device is disengaged and when releasing the gas throttle latch, the braking device is applied and the saw chain is brought to standstill. With this continued braking of the saw chain, the brake band is subjected to the highest stress which quickly leads to wear and a lower service life.

With motor-driven chain saws, it is a problematical condition that the braking device, which is often mounted directly at the driving two-stroke engine, often comes into contact with oil which penetrates between the flexible brake band and the brake drum and leads to a reduction in the coefficient of friction and thereby to increased braking times.

SUMMARY OF THE INVENTION

It is an object of the invention to provide a brake band which is highly resistant to wear and which provides a high coefficient of friction even when coming into contact with oil while at the same time assuring the shortest braking times.

The brake band of the invention is for a motor-driven chain saw. The chain saw includes a saw chain drive having a rotating component which is to be braked by the brake band for bringing the saw chain to standstill. The brake band is arranged in the chain saw so as to surround the rotating component within a predetermined enclosure angle and includes: a band portion made of resilient material for providing a ready stopping force; the band portion having a friction side for engaging the rotating component during braking; and, a thermally-applied friction layer formed on the friction side of the band portion; and, the friction layer including a material selected from the group consisting of carbide and oxide ceramic.

It is advantageous for the friction layer to be based on any one of the following: wolfram carbide, silicon carbide, an oxide ceramic of aluminum, an oxide ceramic of zircon and an oxide ceramic of silicon. It has been surprisingly shown that this kind of wear-reducing, thermally-applied layer can follow the resilient deformations of the brake band without becoming destroyed. In addition, it was determined that even a penetration of oil between the friction partners of brake band and brake drum does not significantly affect the braking times.

By applying the friction layer to the flexible band portion of the brake band, the base material of which the band portion is made can now be a simple unalloyed steel so that less expensive materials can be utilized for manufacturing the brake band. Materials which were previously not used because of their low coefficients of friction can now likewise be used in the manufacture of brake bands.

Even brake bands made of unalloyed material have service lives which are approximately three times greater with the friction layer according to the invention than known brake bands made of high-alloy materials.

In order to assure a good adherence of the thermally-applied friction layers, titanium is added to the friction layer on the one hand, while, on the other hand, the carrier side of the band portion of the brake band is preferably pretreated by sand-blasting the same.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
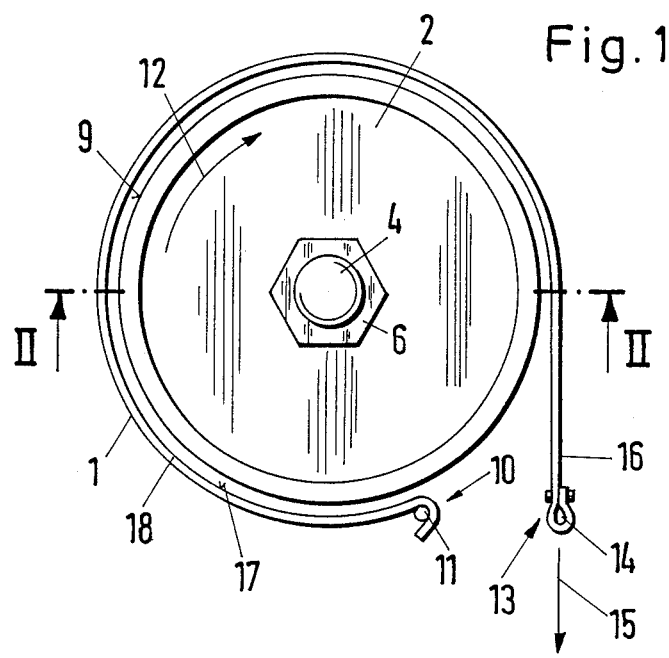
FIG. 1 is a plan view of a brake drum connected to a shaft so as to rotate therewith and with respect to which a brake band is arranged; and, FIG. 2 is a section view taken through the brake drum and brake band along line II—II of FIG. 1.
Figure 2:
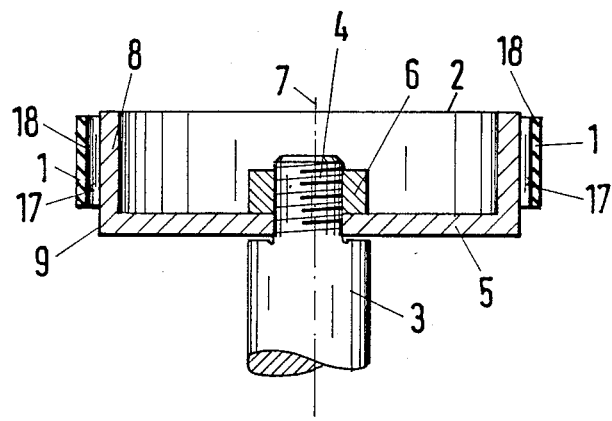

The embodiment illustrated in FIGS. 1 and 2 shows the arrangement of a resilient brake band 1 disposed about the brake drum 2 which is fixedly connected to the shaft 3 so as to rotate therewith. To facilitate attachment of the brake drum, the free end of the shaft 3 is configured as a threaded bolt 4 which penetrates the base 5 of the brake drum 2. A nut 6 threadably engages the thread of threaded bolt 4 and is tightened to hold the brake drum onto the shaft 3 so as to rotate therewith (FIG. 2). For transmitting high braking torques, it is advantageous to provide that the shaft 3 and the brake drum 4 also mutually engage in a form-tight manner. More specifically, a spline connection can be provided at the interface of the nut 6 and threaded bolt 4.

The brake drum 2 is essentially configured so as to have a cup-like shape in the embodiment shown and includes a wall 8 extending coaxially to the rotational axis 7. The outer surface 9 of the wall 8 constitutes the braking surface facing toward the brake band 1.

The flexible brake band 1 comprises a resilient material such as alloyed (V2)-steel (stainless steel) or an unalloyed material such as CK75. It is advantageous to use alloyed steel X12CrNi17.7 as the material for the brake band. Materials of this kind and their compositions and grain size are listed in published German Industrial Standard (DIN) 32529. The brake band 1 surrounds the brake drum by preferably more than 270° in order to obtain the largest possible effective braking surface for a small-size configuration (FIG. 1). In the embodiment shown, the one end 10 of the brake band 1 is held on a bolt 11 fixed to the housing with the brake band 1 leading away from bolt 11 in the direction of rotation 12 of the brake drum 2. The other end 13 has a loop 14 for engaging a brake actuating rod (not shown). The loop 14 is arranged at the free end of the tangential leg 16 of the brake band as shown. If the loop 14 is pushed by the rod (not shown) approximately tangential to the brake drum 2 in the direction of arrow 15, then the brake band 1 will be applied to the brake surface 9 of the drum 2 so as to brake the latter. Since the actuating direction 15 of the brake band 1 and the rotational direction of the brake drum 2 are the same, the applied force of the brake band 1 is self-amplifying.

If the braking force of the loop 14 becomes zero, then the brake band tends to again take on its initial position shown in FIG. 1 because of its resilient base material. This return force effects a lifting of the brake band 1 from the brake drum and a return to its initial position.

The inner side 17 of the brake band 1 facing toward the braking surface 9 carries a friction layer 18 made of carbide or an oxide (ceramic). Preferably, wolfram carbide or an oxide ceramic of the metals aluminum and zircon is provided. Silicon oxide is also advantageously usable as a friction layer.

The brake band, which forms only the carrier of the friction layer, can be simply unalloyed spring steel. It is advantageous to provide better grade alloys as the brake band base material.

The brake band is treated before the friction layer 18 is applied in order to obtain a certain roughness for the good adherance of the friction layer. Preferably, the inner side 17 of the brake band 1 is sand-blasted before applying the friction layer 18. For increasing the adherence of the friction layer on the brake band, titanium can be added in small quantities to the powder from which the friction layer 18 is formed. It is also advantageous to add nickel to the base material of the brake band 1 or to provide adherence layers made of a NI-CROALI-base (a mixture of nickel, chromium, aluminum and itrium). This base is applied by thermal spraying and simultaneously serves as a protection against corrosion since the ceramic layer applied as the friction layer is never entirely tight.

Grain size of the spray powder for the friction layer 18 amounts to less than 50 μm and the grain size preferably lies in the range between 30 to 40 μm.

The friction layer 18 advantageous has a Vickers hardness of approximately 1500 HV and a thickness of 0.1 mm, for example. The powder of the friction layer is applied to the brake band 1 by means of a thermal spray whereby plasma sprays such as flame sprays are understood. Plasma and thermal spraying are described in the technical paper entitled "Protective Coatings and Their Processing - Thermal Spray" by A. R. Nicoll presented as part of the CEI Course on High Temperature Material and Coatings, Jun. 24–29, 1984, Finland.

The coating of the brake band according to the invention having a carbide or ceramic oxide assures lower braking times with higher resistance to wear with the braking times amounting to a fraction of a second. The braking times are not significantly extended even when there is contact with oil and especially lubricating oil of the driving engine of the motor-driven chain saw.

It is understood that the foregoing description is that of the preferred embodiments of the invention and that various changes and modifications may be made thereto without departing from the spirit and scope of the invention as defined in the appended claims.

What is claimed is:

1. A brake band for a motor-driven chain saw, the chain saw including a saw chain drive having a rotating component which is to be braked by the brake band for bringing the saw chain to standstill, the brake band being arranged in the chain saw so as to surround the rotating component within a predetermined enclosure angle, the brake band comprising: a band portion made of a resilient material for providing a ready stopping force; said band portion having a roughened friction side for engaging said rotating component during braking; an adherence layer formed on said roughened friction side by thermally spraying thereon a mixture of nickel, chromium, aluminum and itrium thereby providing protection against corrosion; and, a thermally-applied friction layer formed on said adherence layer on said friction side by said band portion; and, said friction layer including a material selected from the group consisting of carbide and oxide ceramic.

2. The brake band of claim 1, said friction layer being based on a material selected from the group consisting of wolfram carbide and silicon carbide.

3. The brake band of claim 1, said friction layer being based on a material selected from the group consisting of an oxide of aluminum, an oxide of zircon and oxide of silicon.

4. The brake band of claim 1, wherein said thermally-applied friction layer is a sprayed powder having a grain size of less than 50 μm.

5. The brake band of claim 4, wherein the spray powder for said thermally-applied friction layer is applied in the form of a spray powder having a grain size lying in the range of 30 to 40 μm.

6. The brake band of claim 1, said friction layer being plasma-sprayed to said friction side.

7. The brake band of claim 1, said friction layer having a Vickers hardness of approximately 1500 MV.

8. The brake band of claim 1, said friction layer having a thickness of approximately 100 μm.

9. The brake band of claim 1, said material of said band portion being X12CrNi17.7 and said friction side being pretreated by abrasively blasting the same before thermally applying said friction layer thereto.

10. The brake band of claim 1, said material of said band portion being unalloyed spring steel and said friction side being abrasively blasted before said friction layer is applied thereto.

11. A brake band for a motor-driven chain saw, the chain saw including a saw chain drive having a rotating component which is to be brake by the brake band for bringing the saw chain to standstill, the brake band being arranged in the chain saw so as to surround the rotating component within a predetermined enclosure angle, the brake band comprising: a band portion made of a resilient material for providing a ready stopping force; said band portion having a roughened friction side for engaging said rotating component during braking ; an adherence layer formed on said roughened friction side by thermally spraying thereon a mixture of nickel, chromium, aluminum and itrium thereby providing protection against corrosion; and, a thermally-applied friction layer formed on said adherence layer on said friction side of said band portion; said friction layer including a material selected from the group consisting of carbide and oxide ceramic; said material of said friction layer being in the form of powder which is thermally applied to said friction side; and, said powder containing titanium which is added to said powder before it is thermally applied.

* * * * *

UNITED STATES PATENT AND TRADEMARK OFFICE
CERTIFICATE OF CORRECTION

PATENT NO. : 4,949,818
DATED : August 21, 1990
INVENTOR(S) : Reinhard Siede

It is certified that error appears in the above-identified patent and that said Letters Patent is hereby corrected as shown below:

In column 1, line 10: delete "is", second occurrence.

In column 2, line 66: delete "(V2)-steel" and substitute -- (V2A)-steel -- therefor.

In column 3, line 25: insert -- 2 -- after "drum".

In column 3, line 38: delete "adherance" and substitute -- adherence -- therefor.

In column 3, line 54: delete "advantageous" and substitute -- advantageously -- therefor.

In column 4, line 24: delete "by" and substitute -- of -- therefor.

In column 4, line 32: insert -- an -- between "and" and "oxide".

In column 4, line 57: delete "brake" (1st occur.) and substitute --braked-- therefor.

Signed and Sealed this

Fifth Day of November, 1991

Attest:

HARRY F. MANBECK, JR.

*Attesting Officer*     *Commissioner of Patents and Trademarks*